United States Patent
Berkner et al.

(10) Patent No.: US 7,599,095 B2
(45) Date of Patent: *Oct. 6, 2009

(54) WAVELET-BASED IMAGE PROCESSING PATH

(75) Inventors: Kathrin Berkner, Palo Alto, CA (US); Edward L. Schwartz, Sunnyvale, CA (US); Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 11/811,414

(22) Filed: Jun. 7, 2007

(65) Prior Publication Data

US 2008/0037067 A1    Feb. 14, 2008

Related U.S. Application Data

(63) Continuation of application No. 09/658,393, filed on Sep. 8, 2000, now Pat. No. 7,239,424.

(51) Int. Cl.
*G06K 15/00* (2006.01)
*H04N 1/40* (2006.01)

(52) U.S. Cl. .................. 358/2.1; 358/1.9; 382/232; 382/240

(58) Field of Classification Search .............. 382/232, 382/233, 235, 240, 242, 243, 275; 358/1.9, 358/2.1
See application file for complete search history.

(56) References Cited

U.S. PATENT DOCUMENTS

| | | | |
|---|---|---|---|
| 5,412,741 A * | 5/1995 | Shapiro ................... 382/232 |
| 5,497,777 A * | 3/1996 | Abdel-Malek et al. ...... 600/443 |
| 5,717,789 A | 2/1998 | Anderson et al. |
| 5,748,786 A * | 5/1998 | Zandi et al. ................. 382/240 |
| 5,805,721 A | 9/1998 | Vuylsteke et al. |
| 5,867,606 A | 2/1999 | Tretter |
| 5,883,973 A | 3/1999 | Pascovici et al. |
| 5,905,579 A * | 5/1999 | Katayama et al. ........... 358/296 |
| 6,108,609 A * | 8/2000 | Qian et al. .................... 702/66 |
| 6,141,452 A * | 10/2000 | Murao ........................ 382/240 |
| 6,148,111 A * | 11/2000 | Creusere .................... 382/240 |
| 6,195,459 B1 * | 2/2001 | Zhu ............................ 382/176 |
| 6,215,907 B1 * | 4/2001 | Kumar et al. ............... 382/240 |
| 6,236,745 B1 * | 5/2001 | Chen et al. .................. 382/135 |
| 6,594,391 B1 * | 7/2003 | Quadranti et al. ........... 382/203 |
| 6,847,737 B1 * | 1/2005 | Kouri et al. ................ 382/260 |
| 7,239,424 B1 * | 7/2007 | Berkner et al. ............... 358/2.1 |

FOREIGN PATENT DOCUMENTS

WO    WO 99/28865    * 6/1999

OTHER PUBLICATIONS

Abramovich, F., Silverman, B.W., "Wavelet Decomposition Approaches to Statistical Inverse Problems," Biometrika, vol. 85, pp. 115-129, 1998.

(Continued)

*Primary Examiner*—Thomas D Lee
(74) *Attorney, Agent, or Firm*—Blakely, Sokoloff, Taylor & Zafman LLP

(57) ABSTRACT

A system is described. In one embodiment, the system comprises an image processing path and a print engine coupled to the image processing path. The image processing path processes an input image in a wavelet domain.

72 Claims, 11 Drawing Sheets

OTHER PUBLICATIONS

Bhakaran, V., et al., "Text and Image Sharpening of Scanned Images in the JPEG Domain," Proceedings of the 1997 International Conference on Image Processing (ICIP '97), pp. 326-329, 1997.

Donoho, D.L., "Nonlinear solution of linear inverse problems by wavelet-vaguelett decomposition," J. of Appl. and Comp. Harm. Anal, vol. 2, pp. 101-115, 1995.

Mallat, S., A Wavelet Tour of Signal Processing. Academic Press, 1998.

Neelamani, R., Choi, H., Baraniuk, R., "Wavelet-based Deconvolution for Ill-conditioned Systems," in Proceedings of ICASSP, vol. 6, pp. 3241-3244, 1998.

Polesel, A., et al., "Adaptive unsharp masking for contrast enhancement," in Proceedings of ICIP'97, pp. 267-270, 1997.

Zong, X., Laine, A.F., Geiser, E.A., Wilson, D.C., "De-Noising and contrast enhancement via wavelet shrinkage and nonlinear adaptive gain," Proceedings of the SPIE, vol. 2762, pp. 566-574, Orlando, FL, 1996.

Andrews, H.C., Hunt, B.R., Digital Image Restoration. Prentice-Hall, Inc. Englewood Cliffs, New Jersey, 1977.

Berkner, K., Wells Jr, R.O., "Smoothness estimates for soft-threshold denoising via translation invariant wavelet transforms," Tech. Rep. CML TR98-01, Rice University, 1998.

Coifman, R.R., Donoho, D.L., "Translation invariant denoising," in Wavelets and Statistics, Springer Lecture Notes (A. Antoniades, ed.), Springer-Verlag, 1995.

Donoho, D.L., "De-Noising by soft-thresholding," IEEE Transactions on Information Theory, vol. 41, No. 3, pp. 613-627, 1995.

Jain, A.K., Fundamentals of digital image processing. Prentice Hall, Englewood Cliffs, NJ, 1989.

Kingsbury, N., "The dual-tree complex wavelet transform: a new efficient tool for image restoration and enhancement," in Proc. European Signal Processing Conf., pp. 319-322, 1998.

Lang, M., Guo, H., Odegard, J.E., Burrus, C.S., Wells Jr, R.O., "Noise reduction using an un-decimated discrete wavelet transform," IEEE Signal Processing Letters, vol. 3, pp. 10-12, 1996.

Pratt, W., Digital Image Processing, John Wiley & Sons, NY, 1978.

Abramovich, F., Sapatinas, T., Silverman, B.W., "Wavelet Thresholding via a Bayesian Approach," J. Royal Statist. Soc. Ser. B, vol. 60, pp. 725-749, 1998.

Devore, R.A., Jawerth, B., Lucier, B.J., "Image compression through wavelet transorm coding," IEEE Trans. Information Theory, vol. 38, No. 2, pp. 719-746, 1992.

Donoho, D.L., Johnstone, I.M., "Adaption to unknown smoothness via wavelet shrinkage," J. American Statist. Assoc., pp. 1200-1224, 1995.

Donoho, D.L., Vetterli, M., DeBore, R.A., Daubechies, I., "Data compression and harmonic analysis," IEEE Transactions on Information Theory, vol. 44, No. 6, pp. 2435-2476, 1998.

Levy Vehel, J., Guiheneuf, B., "2-microlocal analysis and applications in signal processing" in Proceedings of International Wavelet Conference, Tanger, Morocco, 1998.

Munoz, A., Blu T., Unser, M., "Non-Euclidean Pyramids," in Proceedings of SPIE Conference, San Diego, vol. 4119, pp. 710-720, 2000.

Burt, Peter J., et al., "The Laplacian Pyramid as a Compact Image Code," IEEE Transactions on Communications, vol. Com-31, No. 4, Apr. 1983, pp. 532-540.

Galatsanos, Nikolas P., et al., "Methods for Choosing the Regularization Parameter and Estimating the Noise Variance in Image Restoration and Their Relation," IEEE Transactions on Image Processing, vol. 1, No. 3, Jul. 1992, pp. 322-336.

Lu, Jian, et al., "Contrast Enhancement Via Multiscale Graident Transformation," Proceedings of the 1994 International Conference on Image Processing (ICIP) '97, pp. 482-486.

* cited by examiner $$\begin{bmatrix} 1 & 1 & 0 & 0 & 1 & 1 \\ 1 & 1 & 0 & 0 & 1 & 1 \\ 0 & 0 & 1 & 1 & 0 & 0 \\ 0 & 0 & 1 & 1 & 0 & 0 \\ 1 & 1 & 0 & 0 & 1 & 1 \\ 1 & 1 & 0 & 0 & 1 & 1 \end{bmatrix} \quad \begin{bmatrix} 0 & 0 & 0 & 1 & 1 & 1 \\ 0 & 0 & 1 & 1 & 1 & 0 \\ 0 & 1 & 1 & 1 & 0 & 0 \\ 1 & 1 & 1 & 0 & 0 & 1 \\ 1 & 1 & 0 & 0 & 1 & 1 \\ 1 & 0 & 0 & 1 & 1 & 1 \end{bmatrix}$$

halftone pattern in image     diagonal line pattern in image $$\begin{bmatrix} 0 & 2 & 0 & -2 & 0 & 2 \\ 0 & 0 & 0 & 0 & 0 & 0 \\ 0 & -2 & 0 & 2 & 0 & -2 \\ 0 & 0 & 0 & 0 & 0 & 0 \\ 0 & 2 & 0 & -2 & 0 & 2 \\ 0 & 0 & 0 & 0 & 0 & 0 \end{bmatrix} \quad \begin{bmatrix} 0 & 0 & 0 & 0 & 0 & 0 \\ 2 & 0 & -2 & 0 & 2 & 0 \\ 0 & 0 & 0 & 0 & 0 & 0 \\ -2 & 0 & 2 & 0 & -2 & 0 \\ 0 & 0 & 0 & 0 & 0 & 0 \\ 2 & 0 & -2 & 0 & 2 & 0 \end{bmatrix} \quad \begin{bmatrix} 0 & 0 & 0 & 0 & 0 & 0 \\ -2 & 0 & 2 & 0 & -2 & 0 \\ 0 & 0 & 0 & 0 & 0 & 0 \\ 2 & 0 & -2 & 0 & 2 & 0 \\ 0 & 0 & 0 & 0 & 0 & 0 \\ -2 & 0 & 2 & 0 & -2 & 0 \end{bmatrix}$$

halftone pattern in HL, LH, HH band (left to right)

$$\begin{bmatrix} 1 & 1 & -1 & -1 & 0 & 1 \\ 1 & -1 & -1 & 0 & 1 & 1 \\ -1 & -1 & 0 & 1 & 1 & 0 \\ -1 & 0 & 1 & 1 & 0 & -1 \\ 0 & 1 & 1 & 0 & -1 & -1 \\ 1 & 1 & 0 & -1 & -1 & 0 \end{bmatrix} \quad \begin{bmatrix} 1 & 1 & -1 & -1 & 0 & 1 \\ 1 & -1 & -1 & 0 & 1 & 1 \\ -1 & -1 & 0 & 1 & 1 & 0 \\ -1 & 0 & 1 & 1 & 0 & -1 \\ 0 & 1 & 1 & 0 & -1 & -1 \\ 1 & 1 & 0 & -1 & -1 & 0 \end{bmatrix} \quad \begin{bmatrix} -1 & 1 & 1 & -1 & 0 & -1 \\ 1 & 1 & -1 & 0 & -1 & 1 \\ 1 & -1 & 0 & -1 & 1 & 1 \\ -1 & 0 & -1 & 1 & 1 & -1 \\ 0 & -1 & 1 & 1 & -1 & 0 \\ -1 & 1 & 1 & -1 & 0 & -1 \end{bmatrix}$$

diagonal line pattern in HL, LH, HH band (left to right)

| $x\_1$ | $x\_2$ | $x\_3$ |
| --- | --- | --- |
| $x\_4$ | $x\_5$ | $x\_6$ |
| $x\_7$ | $x\_8$ | $x\_9$ |

HL

| $x\_1$ | $x\_2$ | $x\_3$ |
| --- | --- | --- |
| $x\_4$ | $x\_5$ | $x\_6$ |
| $x\_7$ | $x\_8$ | $x\_9$ |

HH

| $x\_1$ | $x\_2$ | $x\_3$ |
| --- | --- | --- |
| $x\_4$ | $x\_5$ | $x\_6$ |
| $x\_7$ | $x\_8$ | $x\_9$ |

HH

| $x\_1$ | $x\_2$ | $x\_3$ |
| --- | --- | --- |
| $x\_4$ | $x\_5$ | $x\_6$ |
| $x\_7$ | $x\_8$ | $x\_9$ |

WAVELET-BASED IMAGE PROCESSING PATH

This is a continuation of U.S. application Ser. No. 09/658,393, filed on Sep. 8, 2000 now U.S. Pat. No. 7,239,424, entitled "Wavelet-Based Image Processing Path," assigned to the corporate assignee of the present invention and incorporated herein by reference.

FIELD OF THE INVENTION

The present invention relates to the field of image processing; more particularly, the present invention relates to a wavelet-based image enhancement system.

BACKGROUND OF THE INVENTION

Image processing has many applications. One such application is in a digital copier. A digital copier typically has different modes for copying text or an image. The different modes, text or letter mode vs. photo mode, include special image processing techniques such as sharpening or smoothing of the scanned document, thinning of text, despeckeling, etc. Problems arise if the copied document has text and image content. In order to apply different techniques to text and image regions of a document, a segmentation of the document or a classification of the pixel of the scanned document is needed. Without out this classification, an oversmoothing of text in the photo-mode may occur and an enhancement of halftone noise in the text mode may occur. A consequence of this enhancement of halftone noise in the text mode can be the creation of severe Moire patterns after resolution reduction. Such artifacts are observed in many current digital copiers. A typical imaging path for digital gray scale copier is demonstrated in FIG. 1.

Referring to FIG. 1, a scanned image 100 is input into processing block 101, which changes gray values in the scanned image to compensate for scanner bias through lookup tables or other point operation (e.g., gamma correction). Next, different regions in the scanned image are classified (e.g., text, halftone, continuous tone, etc.) (processing block 102). The pixels are then filtered by processing block 103 depending on the classified pixel. Such filtering may include smoothing or sharpening of pixels based on their classification. After filtering, the pixels undergo up and/or downsampling by processing block 104. The pixels may also be subjected to resizing for enlarging/reducing. Next, the gray values of the pixels are changed through look up tables or other point operation (e.g., gamma correction) to compensate for printer bias (processing block 105). Once changing of the gray values has been done, halftoning is performed on the pixels (processing block 106). For non-copier applications, halftoning might be replaced with another output formatting step, the result of which is processed image 107.

Single components of the digital imaging copier path are prior art, such as contrast enhancement of the scanned image or halftoning for printing. See U.S. Pat. No. 5,883,973, entitled "Method and Apparatus for Processing a Document by Segmentation into Text and Image Areas," issued Mar. 16, 1999 to Pasovici and Shu, and U.S. Pat. No. 5,805,721, entitled "Method and Apparatus for Contrast Enhancement," issued Sep. 8, 1998 to Vuylsteke and Schoeters. There are also publications on image enhancement with wavelets that include denoising and contrast enhancement. For example, Zong, Laine, Geiser, and Wilson, "De-Noising and Contrast Enhancement via Wavelet Shrinkage and Non-linear Adaptive Gain," Proceedings of the SPIE, Vol. 2762, pgs. 566-574, 1996. Image enhancement using the Laplacian pyramid to add high frequency content to the image is also known. For example, see U.S. Pat. No. 5,717,789, entitled "Image Enhancement by Non-linear Extrapolation in Frequency Space," issued February 1998 to Anderson and Greenspan.

SUMMARY OF THE INVENTION

A system is described. In one embodiment, the system comprises an image processing path and a print engine coupled to the image processing path. The image processing path processes an input image in a wavelet domain.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4A illustrates the formation of wavelet coefficients of a halftone and diagonal line pattern using a 2D Haar wavelet transform.

FIG. 5 illustrates 3×3 windows in the LH, HL, HH bands at level one of the wavelet decomposition.

DETAILED DESCRIPTION OF THE PRESENT INVENTION

Figure 1:
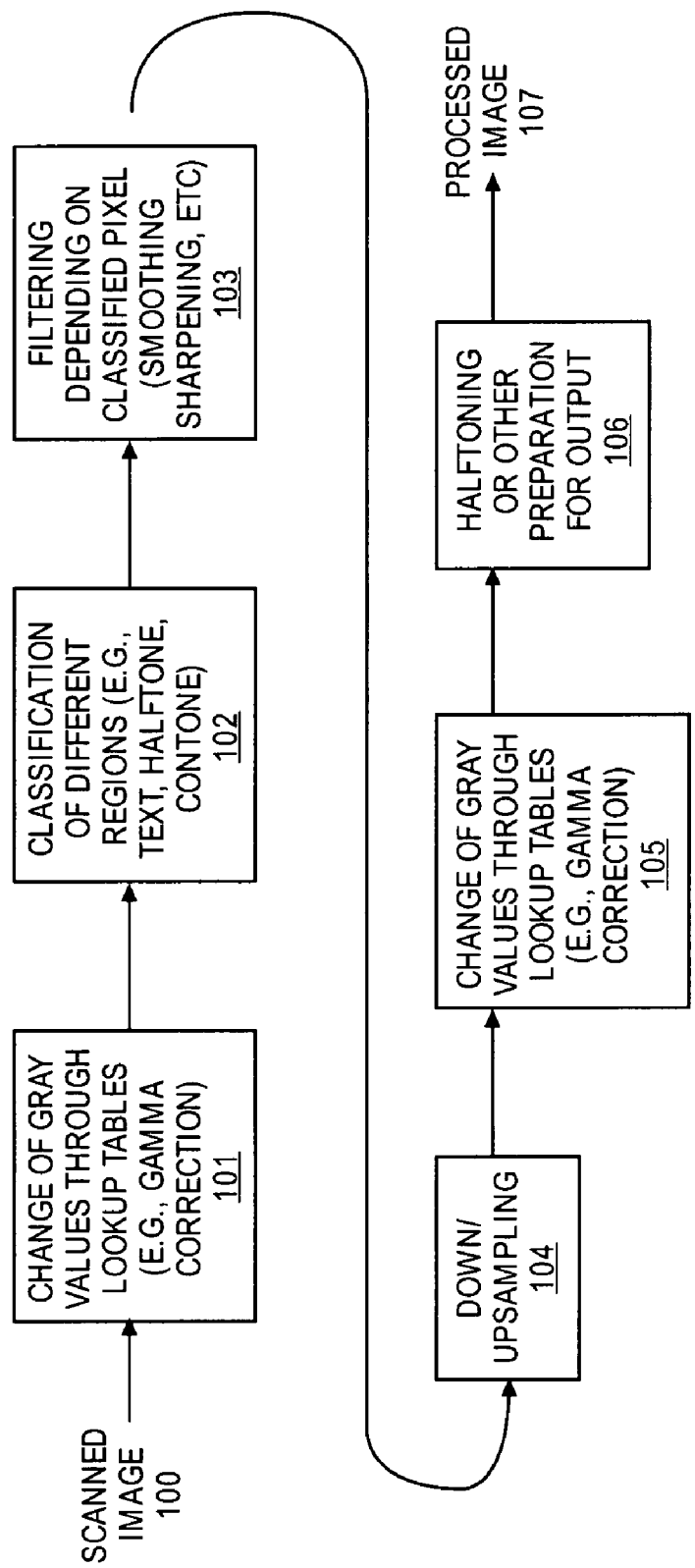
FIG. 1 illustrates a prior art image processing path for a grayscale copier.

A method for processing an image and apparatus for doing the same are described. In the following description, numerous details are set forth in order to provide a thorough understanding of the invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The processing described herein provides for image processing between scanned (or otherwise sensed) digital images and digital images for display or printing. This image processing might be in a digital image in, digital image out device such as, for example, a printer controller (e.g., for a network) or performed in a general purpose computer. The image processing described herein might be combined with an analog input device in, for example, a scanner or digital camera, with a print engine in a printer or with another output device, or with both an input and output device, for example in a digital copier, facsimile machine or multifunction machine.

The wavelet-based image processing described herein may be used to compensate for differences between input and output systems. Some image in and image out systems have matched input and output devices that require little or no image processing between input and output for particular types of images. For example, some video cameras and video displays are well matched and good results for images of natural scenes require little or no intermediate processing. In contrast, some systems have dissimilar input and output devices or complex/compound image types where significant processing is required. For example, an input device might require less noise, higher sharpness and/or a different size/scale than the input device provides. Additionally different images or different positions in the same image might have different enhancement. The wavelet-based image processing described herein may be used to process an image from an input system (e.g., device) so that it "matches" the output system (e.g., device).

Overview of a Wavelet-based Image Processing System

A wavelet-based imaging path for a digital copier or multifunction machine having automatic adaption of image processing routines to various characteristics in the image such as, for example, text and background is described.

Figure 2A:
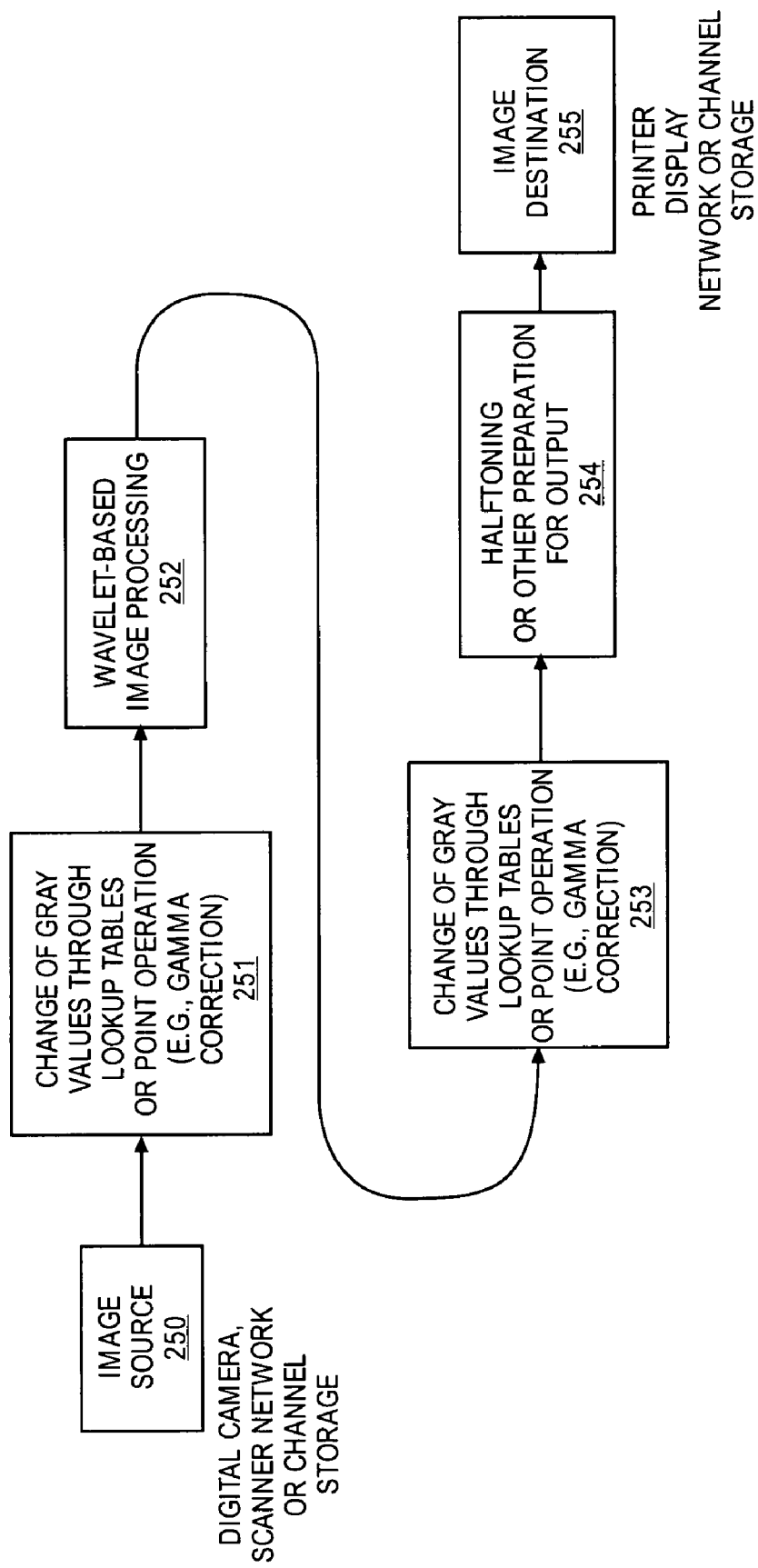
FIG. 2A is a block diagram of one embodiment of a system having a wavelet-based image processing path.

The wavelet-based image processing may occur after non-wavelet-based processing blocks or modules and/or before other non-wavelet-based processing blocks or modules. FIG. 2A is a block diagram of a system having a wavelet-based image processing path. Referring to FIG. 2A, an image source 250 generates image data. Image source 250 may comprise, for example, a digital camera, scanner, a network or channel, storage, etc. Then processing logic, optionally, changes gray values through look up tables (e.g., gamma correction) (processing block 251). Alternatively, the image data may be subjected to a point operation. Afterwards, processing image data is received by wavelet-based image processing block 252 for wavelet-based processing. After wavelet based processing, processing logic optionally changes the gray values of the image data through look up tables (e.g., gamma correction) or, alternatively, a point operation. Next, processing logic performs halftoning on the image data or some other form of preparation for output (processing block 254) and delivers the processed image data to an image distinction 255. Image distinction 255 may comprise, for example, a printer, print engine, display, network or channel, or storage.

Figure 2B:
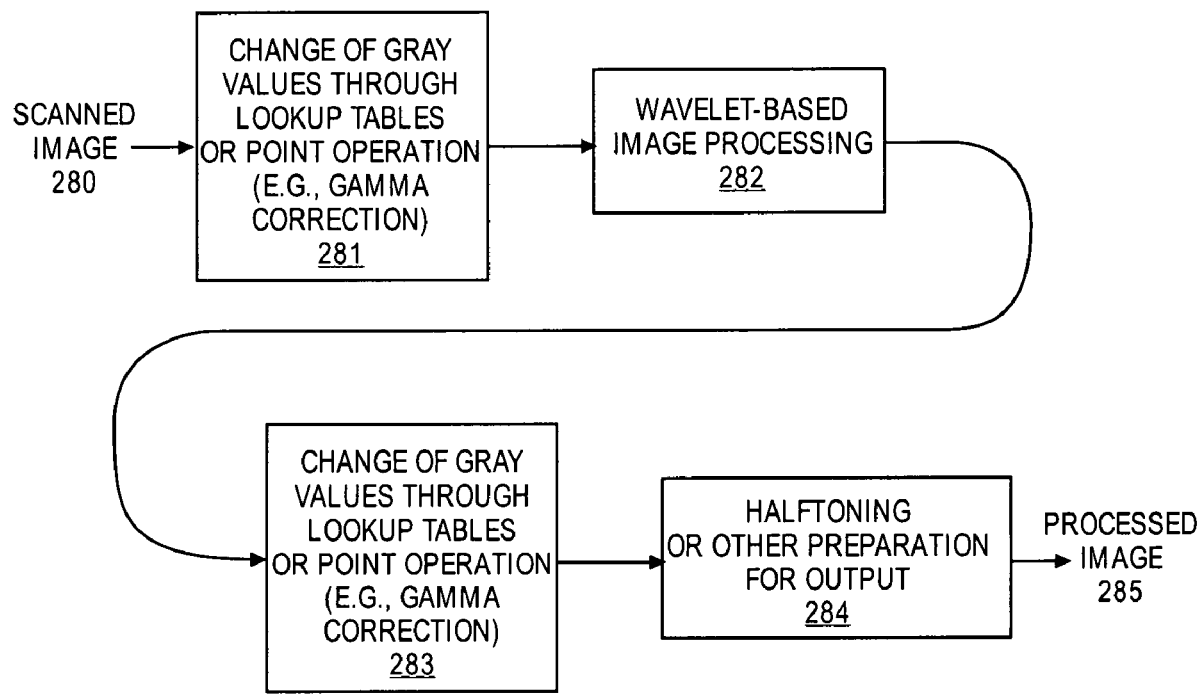
FIG. 2B is a block diagram of one embodiment of a digital copier.

FIG. 2B is a block diagram of a copier. Referring to FIG. 2B, processing logic receives a scanned image 280, and then, optionally, changes gray values in the scanned image 200 through look up tables (e.g., gamma correction) (processing block 281). Alternatively, scanned image 280 may be subjected to a point operation. Afterwards, processed image data is received by wavelet-based image processing block 252 for wavelet-based processing. After wavelet-based processing, processing logic optionally changes the gray value of the image data through look up tables (e.g., gamma correction) or, alternatively, a point operation. Next processing logic performs halftoning on the image data or some other form of preparation for output (processing block 254), thereafter outputting processed image 285.

Figure 2C:
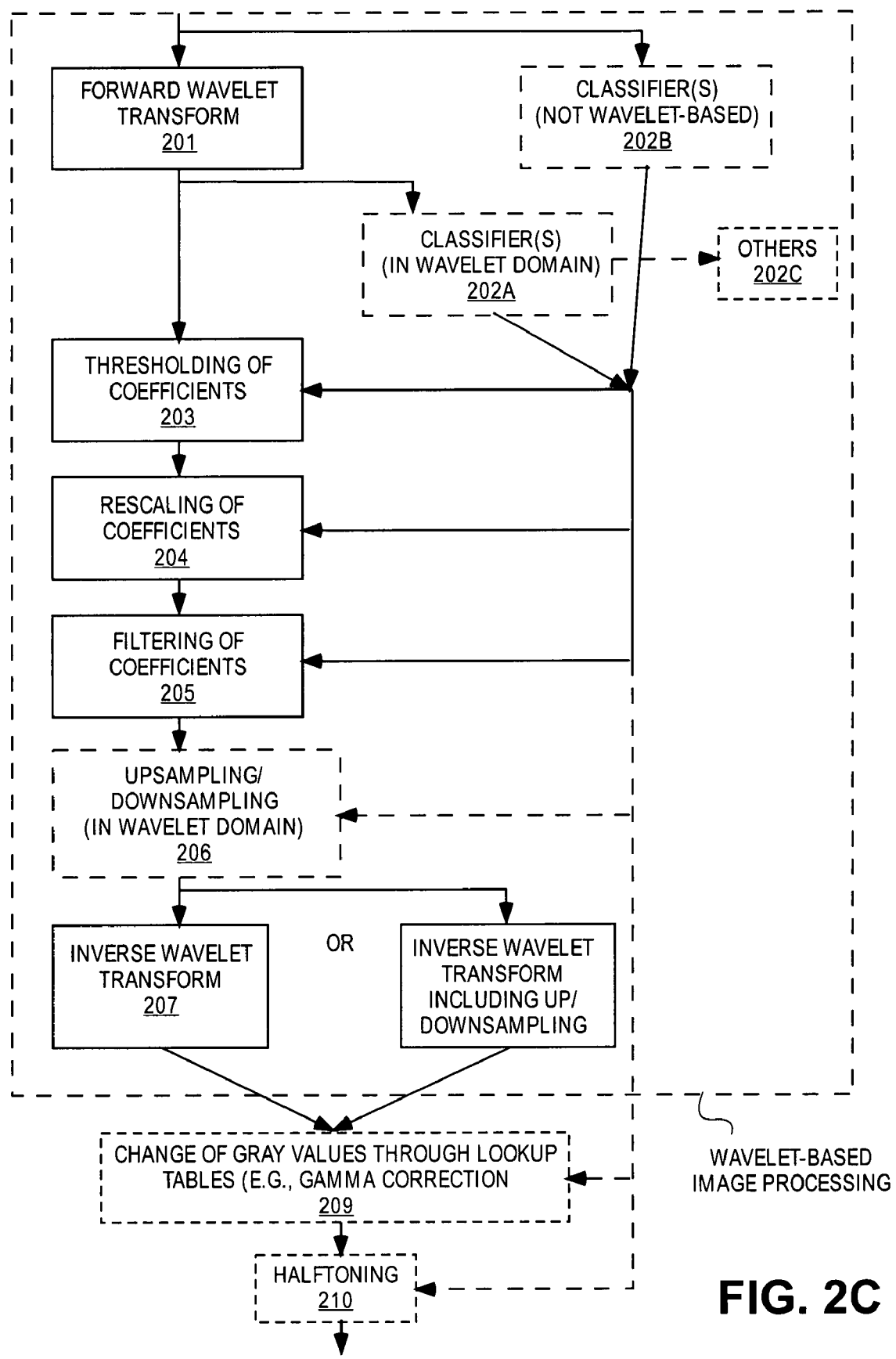
FIG. 2C is a block diagram of one embodiment of a wavelet-based processing path for a digital copier.

FIG. 2C is a block diagram of one embodiment of a wavelet-based image processing path for a digital copier. In one embodiment, this image processing path replaces processing blocks 102-106 in FIG. 1 in a copier or other image processing device. The processing may be performed by processing logic that may comprise hardware, software or a combination of both.

Referring to FIG. 2C, forward wavelet transforms block 201 performs a wavelet transform on the scanned image to create a set of coefficients. The coefficients may be optionally sent to wavelet-based classifier processing block 202A, which classifies the coefficients. Alternatively, image data may be directly input to a non-wavelet-based classifier block 202B. The classifier information output from classifier processing blocks 202A and 202B may be used in cooperation with processing block 203-206, 209, 210 and 202C. These processing blocks are described below.

Processing logic performs thresholding on the coefficients output from wavelet transform block 201 (processing block 203). After thresholding, processing logic rescales coefficients (processing block 204). Next, processing logic filters coefficients (processing block 205).

After filtering coefficients, processing logic may optionally perform upsampling or downsampling (processing block 206). Subsequently, processing logic performs an inverse wavelet transform on the coefficients (processing block 207). In an alternative embodiment, processing logic performs an inverse wavelet transform that includes upsampling and/or downsampling (processing block 208). Note that if processing logic performs an inverse wavelet transform in combination with up/downsampling (i.e., processing block 208), the processing block 206 is not performed.

After performing an inverse transform, processing logic changes gray values on the image data through a look up table or other point operation (e.g., gamma correction) (processing block 209). Processing logic then performs halftoning on the image data (processing block 210). The output of halftoning block 210 is a processed image 220. Note that processing blocks 209 and 210 are not performed in the wavelet domain.

The use of signal-adaptive nature of wavelet domain image processing, including a description of each of these blocks follows.

Critically Sampled or Overcomplete Discrete Wavelet Decomposition

Initially, in the image processing path, forward wavelet transform block 201 performs a wavelet decomposition on the scanned image up to a chosen level L. L may be any number of levels, but 2 or 3 levels is sufficient for many applications. This transform may be critically sampled or overcomplete. Besides overcomplete (fully redundant) and critically sampled wavelet transforms, a transform with reduced redundancy or a complex transform could also be used. An example for reduced redundancy is the computation of all phases of the critically sampled wavelet transform at the first level of resolution and only some of the phases, such as every other phase at the second level of resolution (see Selesnik, I. W. "Smooth Wavelet tight Frames with Limited Redundancy," Technical report, Dept. Electrical Engineering, Polytechnic University, Brooklyn, N.Y., August 1999). Alternatively, the phases could be chosen dynamically, e.g., by selecting those that contain the most energy. For example, see Coffman, R. R., Donoho, D. L. "Translation-invariant Denoising," in *Wavelets and Statistics* (Editor A. Antoniades), Springer Lecture Notes, Springer-Verlag, 1995. Complex transforms compute real and imaginary parts wavelet coefficients, which results in a redundancy factor of two. The imaginary parts contain phase information on an image region. For example, see Kingsbury, N. "The dual-tree complex wavelet transform: a new efficient tool for image restoration and enhancement," Proceedings European Signal Processing Conf., 1998, pp. 319-322.

If the image is given by N×N data points then, when using a critically sampled wavelet transform for L levels, the decomposition is also given by N×N data points, namely wavelet and scaling coefficients. When using the overcomplete wavelet transform for L levels, the decomposition is given by (3L+1)N×N data points.

In both cases, wavelet coefficients $d_l$ for levels l=1 to L and scaling coefficients $c_L$ at the coarsest level have to be stored. In one embodiment, an overcomplete Haar wavelet transform is used. An example of a 1D critically sampled Haar transform (without $L_2$-normalization, low pass=a+b, high pass=a−b; ignore boundaries) is given below:

TABLE 1

| input | low pass output | high pass output |
|---|---|---|
| 5 | | |
| | 12 | −2 |
| 7 | | |
| 1 | | |
| | 2 | 0 |
| 1 | | |
| 8 | | |
| | 15 | 1 |
| 7 | | |

An example of overcomplete Haar transform is as follows:

TABLE 2

| input | low pass output | high pass output |
|---|---|---|
| 5 | | |
| | 12 | −2 |
| 7 | | |
| | 8 | 6 |
| 1 | | |
| | 2 | 0 |
| 1 | | |
| | 9 | −7 |
| 8 | | |
| | 15 | 1 |
| 7 | | |

Examples of filter coefficients for different wavelet systems are as follows:

Haar: [1 1], [1 −1] normalized by $1/\sqrt{2}$.

2-6: [1 1], [−⅛ −⅛ 1 −1 ⅛ ⅛] normalized by $1/\sqrt{2}$.

5-3: [−¼ ½ 3/2 ½ −¼], [¼ −½ ¼] normalized by $1/\sqrt{2}$.

2-10: [1 1], [3 3 −22 −22 128 −128 22 22 −3 −3]/128 normalized by $1/\sqrt{2}$.

9-7: [0.037828 −0.023849 −0.110624 0.377402 0.852699 0.377402 −0.110624 −0.023849 0.037828], [0.064539 −0.040689 −0.418092 0.788486 −0.418092 −0.040689 0.064539]

daub6: [0.0352 −0.0854 −0.1350 0.4599 0.8069 0.3327], [−0.3327 0.8069 −0.4599 −0.1350 0.0854 0.0352].

The forward low pass and high pass filters are specified. For symmetric biorthogonal filters, the inverse filters are the forward filters with alternating signs changed starting with the second and reversed. For example for the 2-6 filter:

Forward low pass (1 1)$1/\sqrt{2}$

Forward high pass (−1;8 −1;8 1 −1/1;8/1;8)$1/\sqrt{2}$

Inverse low pass (−⅛ ⅛ 1 1 ⅛ −⅛)$1/\sqrt{2}$

Inverse high pass (−1 1)$1/\sqrt{2}$

This selection of filters covers the characteristics for the most widely used wavelet families (orthogonal, biorthogonal, symmetric, even-length, odd-length). The transform may also be any LeGaul-Tabatabai biorthogonal transform.

For a two dimensional wavelet transform, both low pass and high pass filters are applied horizontally and vertically. The four resulting subbands are:

| Subband | horizontal filter | vertical filter |
| --- | --- | --- |
| LL | low pass | low pass |
| HL | high pass | low pass |
| LH | low pass | high pass |
| HH | high pass | high pass |

Multiscale Sharpening, Smoothing and Denoising

In one embodiment, thresholding and multiplication are performed on the wavelet coefficients to achieve denoising, sharpening, and smoothing. A criterion dictates whether thresholding or multiplication are applied. In one embodiment, the criterion comprises the magnitude of wavelet coefficients. Alternatively, a classifier could be used to indicate whether to apply thresholding and/or multiplication.

Denoising by Thresholding

Denoising may be performed by setting all coefficients below a given threshold to zero. This technique is known as hard-thresholding and is well-known in the art. As an alternative, soft-thresholding, e.g., shrinking the coefficients above the threshold toward zeros by the amount of the threshold can also be considered. Such a technique may be advantageously used for critically sampled and overcomplete wavelet decompositions, and is described in Donoho, "Denoising by Soft-Thresholding", IEEE Transactions on Information Theory, 41(3): 613-627, 1995. The threshold may be one that is calculated for the presence of additive Gaussian White noise in an image. This threshold depends only on the size of the data and the variance of the noise which is estimated from the wavelet coefficients using a well-known procedure (e.g., statistical estimation of variance). Other choices of threshold selection may be used. These may be calculated from a series of test images.

There are additional strategies for thresholding available. There may be a global threshold or different thresholds for different levels of decomposition or different bands (LH, HL, HH). The thresholds may be set manually. Thresholds may depend on one or more of the following parameters:

1. Standard deviation or median of absolute values of coefficients in one region (e.g., HH coefficients at level 1) (global threshold)
2. Standard deviation or median of absolute values of HH coefficients at each level (level-dependent threshold)
3. Standard deviation or median of absolute values of LH/HL/HH coefficients at first level (band-dependent threshold). For the example of two levels of decomposition three thresholds are chosen
4. Standard deviation or median of absolute values of LH/HL/HH coefficients at each level (level-band-dependent threshold). For the example of two levels of decomposition, six thresholds are chosen.
5. Manually set thresholds (global, level-dependent, level-band dependent) using controls that are part of the user interface of the device.
6. Local thresholding by computing local variances or medians of coefficients in between a band.
7. Given classifier: select for each strategy (global, level-dependent, level-band dependent) a number of thresholds corresponding to the number of classes. Then use those classifier-dependent thresholds.

Laplacian based techniques applied to wavelets do not perform the superior wavelet-only denoising. It is important to note that wavelet denoising techniques do not apply to Laplacian pyramid decompositions. Laplacian pyramid decompositions can be used only for systems where inferior or no denoising is acceptable.

Rescaling of Coefficients

After any denoising is completed, the wavelet coefficients that are non-zero are modified for the purpose of sharpening or smoothing. In one embodiment, sharpening or smoothing of the image is obtained by multiplication of wavelet coefficients with a level-dependent parameter $\mu_j > 0$. For sharpening, the high frequency bands should be multiplied with a larger factor than the low frequency bands, whereas for smoothing the low frequency bands should be multiplied with larger factors than the high frequency bands. One way to obtain this rescaling is to multiply the coefficients at level j with $\mu_j = R \cdot 2^{\alpha j}$. The parameter functions as a renormalization factor for preserving the global energy of coefficients and a is the parameter that determines the degree of sharpening ($\alpha < 0$) or smoothing ($\alpha > 0$). For more information, see U.S. patent application Ser. No. 09/467,544, entitled "Multiscale Sharpening and Smoothing With Wavelets," filed Dec. 10, 1999, assigned to the corporate assignee and incorporated herein by reference. There are many choices for the parameter R that depend on how the energy of an image is measured. One way would be to preserve the $L^2$ norm $$\sqrt{\sum_{i,j} |x_{i,j}|^2}$$

of the image before and after rescaling, i.e. compute R with $$R^2 = \left(\sum_{j,k} |d_{j,k}|^2\right) \bigg/ \left(\sum_{j,k} |\mu_j d_{j,k}|^2\right)$$

If the scanned image is assumed to have a Hoelder regularity of $\gamma$ (typically $\gamma \geq 1$), an approximation of $R^2$ can be obtained by the following estimate.

$$R^2 = \left[\frac{2^{(L+1)2\gamma} - 2^{2\gamma}}{2^{2\gamma} - 1}\right] \bigg/ \left[\frac{2^{(L+1)2(\gamma+\alpha)} - 2^{2(\gamma+\alpha)}}{2^{2(\gamma+\alpha)} - 1}\right]$$

This approximation can be computed a-priori and does not depend on the actual values of wavelet coefficients.

Instead of using the $L^2$ norm, there are other choices for the norm. Using the theory of Besov space, it is possible to preserve a specific Besov norm of the image. This norm is defined as a weighted sum of wavelet coefficients. The parameter R can be computed as $$R^q = \left(\sum_j 2^{j(\alpha+q+1/2)} \left(\sum_k |d_{j,k}|^p\right)^{q/p}\right) \bigg/ \left(\sum_j 2^{j(\alpha+q+1/2)} \left(\sum_k |\mu_j d_{j,k}|^p\right)^{q/p}\right)$$

for $0 < p, q < \infty$.

For p,q=∞, the term $(\Sigma | \ldots |^s)^{1/s}$ in the previous equation is substituted by $\sup|d_{j,k}|$.

In one embodiment, the choice of the parameters α and R can be controlled by the user interface of a device, giving the user the opportunity to select more/less sharpening, or more/less smoothing. This parameterization of sharpening and smoothing allows a fine graduation of degrees of enhancement.

As shown in FIG. 2 information obtained from a classifier can be used to determine different parameter $\alpha_i$, $R_i$ for different classified areas $A_i$ in the image.

Filtering of Coefficients

The frequency content of a single subband at a specific level of decomposition can be modified by a filtering of that subband. For example, additional sharpening of the image could be performed by filtering the LL component at the largest level of decomposition with a sharpening filter. In a similar way, additional smoothing could be performed by applying a smoothing filter to the LL component. Another possibility is to remove periodic patterns in a specific band by applying a special filter (e.g., a bandpass or notch filter) to that specific band/component of the wavelet decomposition. Thus, a formulation filter is applied in the wavelet domain (e.g., the LL domain) that is equivalent to a larger filter in the pixel domain.

A filter may be used that is suited to reduce or remove special periodicities out of the image. The output of this filter may be used to select different denoising thresholds for half-tone and text regions. Periodicity detection can be done with autocorrelation or similar functions. For example, $$f_i^j = \frac{1}{2}(|x_i - x_{i-j}| + |x_i - x_{i+j}|)$$

or $$f_i^j = \sqrt{\frac{1}{2}((x_i - x_{i-j})^2 + (x_i - x_{i+j})^2)}$$

There is periodicity with period 2 at location i if $$f_i^2 < f_i^1$$

There is periodicity with period 3 at location i if $$f_i^3 < f_i^1$$

In some applications, the period (of the periodicity) is known. The period might be determined from the screen size of a halftoned original to be copied and the resolution of the copier's scanner. For example, consider a period of 3. Small amplitude wavelet coefficients might be filtered in one dimension by $$d_i^{filtered} = \frac{(d_{i-1} + d_i + d_{i+1})}{3}$$

For the overcomplete Haar at level 1 (and no adaptive processing such as denoising), this is equivalent to the linear filter [1 2 2 1] in the spatial domain.

A two dimensional example is $$d_i^{filtered} = 1/9 \begin{pmatrix} d_{i-1,j-1} + d_{i,j-1} + d_{i+1,j-1} + \\ d_{i-1,j} + d_{i,j} + d_{i+1,j} + \\ d_{i-1,j+1} + d_{i,j+1} + d_{i+1,j+1} \end{pmatrix}$$

For the overcomplete Haar at level 1 this is equivalent to the following linear filter in the pixel domain.

$$\begin{bmatrix} 1 & 2 & 2 & 1 \\ 2 & 4 & 4 & 2 \\ 2 & 4 & 4 & 2 \\ 1 & 2 & 2 & 1 \end{bmatrix}$$

Similar 1×5 or 5×5 filters might be used for period 5. When even symmetric wavelet filters are used, even period periodicities are removed easily by the wavelet and extra processing is typically only desired for odd periods.

Use of a Classifier and an Exemplary Classifier

In one embodiment, denoising, sharpening and smoothing of wavelet coefficients is controlled using a classifier. A classifier could be computed based on information extracted from the wavelet coefficients or from some other information source, e.g. the image pixels (FIG. 2).

As a decision making step classification is part of a segmentation process that decomposes an image into various components.

Classification or segmentation can be used for many things in a system. It can be used to control one or more of: de-noising, sharpening/smoothing, upsampling/downsampling, change of gray values through lookup table (e.g. gamma correction), halftoning, under-color removal and/or image compression. Non-wavelet based filtering methods may have a single filter that performs denoising and sharpening/smoothing, and classification would select between different filters. With wavelet-based processing, not only are different parameters used for denoising and sharpening/smoothing, but also different scales or different wavelet subband may use different parameters. This flexibility is an advantage of wavelet based processing. Having classification only control desired parameters reduces the effect of classification errors. For example for de-noising and sharpening/smoothing in one system, perhaps only de-noising is controlled by classification or denoising at the first transform level. In another system, perhaps denoising and sharpening/smoothing at the first two transform levels are affected by classification.

Regardless of the source of the classification, the result can be used for a variety of things including: setting smoothing parameters, setting sharpening parameters, choosing an "ordinary" linear filter for sharpening or smoothing, controlling the under color removal process in color copiers/printers, as an input to a document classification algorithm, as an input to a compression algorithm (like JBIG 2), as a way to control a halftoning algorithm (or to turn off halftoning for certain image types switch between error diffusion and ordered dither). For example, when performing under color removal, one classifier may be as follows:

classify as text or line→black=min (cyan, magenta, yellow)

classify as not text or line→black =α min (cyan, magenta, yellow) where 0<α<1, for example α=0.75

Figure 3A:
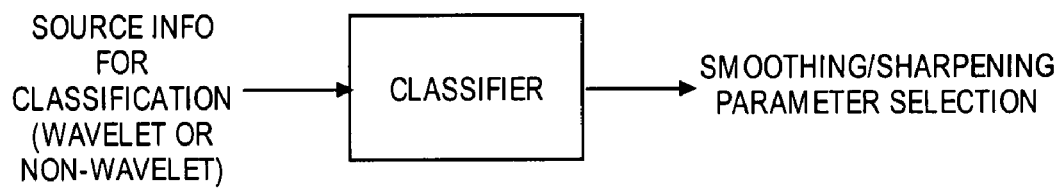
FIG. 3 illustrates a classifier for use in a copier or printer.
Figure 3B:
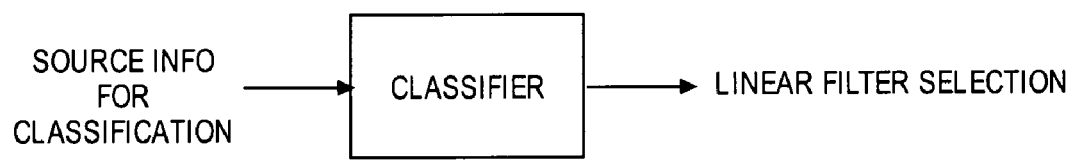
Figure 3C:
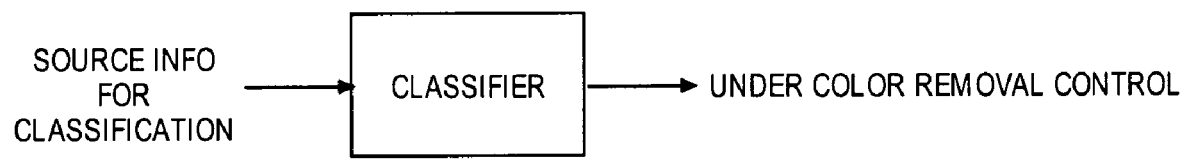

In a compression framework, JBIG2 and MRC use classification in the sense that the encoder must decide how to classify, but no explicit classification scheme is specified (ISO/IEC 16485: Information technology—Mixed Raster Content (MRC)). These methods could use a wavelet-based classifier in the encoder. Such a classifier is shown in FIGS. 3A-3C.

Classifiers can distinguish between a variety of different image area types:
- text and line art versus other
- black and white text versus colored or gray text
- text with patterned backgrounds versus text on plain backgrounds
- text of various sizes
- halftone versus other
- gathered dot halftones versus other halftones
- gathered dot halftones of various screen frequencies
- continuous-tone image versus other Spatial domain classifiers can be mapped to the wavelet domain. Each wavelet coefficient has a support in the spatial domain. The AND, OR or majority of the spatial domain classifications for the area of support for a coefficient can be used for the classification of a coefficient. Similarly, a wavelet domain classifier can be mapped to the spatial domain. The AND, OR or majority of the wavelet domain classifications for coefficients that have support including a particular pixel can be used for the classification of a pixel.

Figure 6:
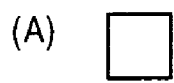
FIG. 6 illustrates exemplary coefficient templates.
Figure 6:
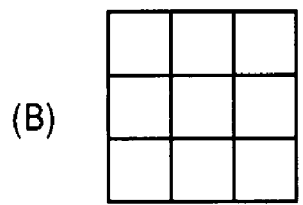
Figure 6:
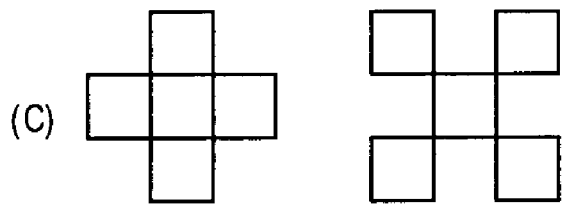
Figure 6:
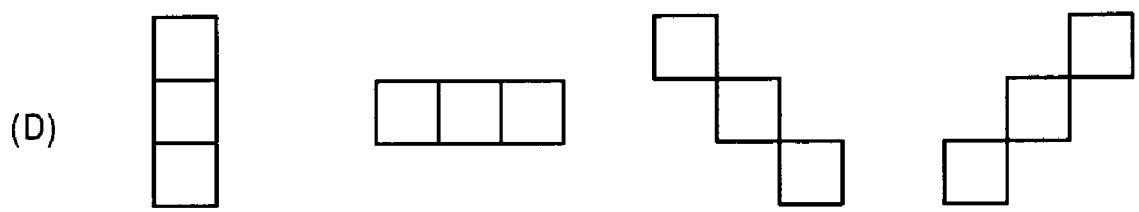

Many kinds of classifiers can be implemented in the wavelet domain. Classifiers can be based on the value of a coefficients (FIG. 6A) or on statistics from regions of coefficients (FIGS. 6B,C,D), a more thorough explanation of which are given below. Possible statistics include:

Mean $$\bar{x} = (1/n) \sum_n x$$

and standard deviation $$sd = \sqrt{\frac{1}{n} \sum_n (x - \bar{x})^2}$$

mean and first absolute moment $$\frac{1}{n} \sum_n |x - \bar{x}|$$

minimum and maximum
minimum
maximum

A location might be classified as text (and not halftone or continuous tone image) if the mean of region was about a threshold T1 and if the variation (standard deviation or first absolute moment) was below a second threshold T2.

In one embodiment, to compute a classifier from wavelet coefficients, the local standard deviations of wavelet coefficients in different bands, levels or across bands and levels, may be computed. For example, if each level has three bands (LH, HL, and HH), then the mean for a detail coefficient is:

$$ew = \frac{d_{LH} + d_{HL} + d_{HH}}{3}$$

The standard deviation across the bands is $$(d_{LH} - ew)^2 + (d_{HL} - ew)^2 + (d_{HH} - ew)^2.$$

Depending on those measures, text halftone and background regions can be differentiated and a different denoising, smoothing, and sharpening parameter(s) may be applied. For example, text may be identified when the standard deviation of coefficients at one or over several levels is small, and halftone may be identified if the standard deviation is high. This makes it possible to distinguish halftone portions from lines. Thus, different denoising, sharpening or smoothing parameters may be selected for spatial areas (e.g., local regions in wavelet components), different bands, resolutions.

In one embodiment, a halftone-vs-line classifier is used in a wavelet-based image processing path of a copier. The difference between halftoned areas and text areas is that halftone areas consist of periodic patterns, whereas text consists of constant gray values in one direction.

A vertical line in the image produces large wavelet coefficients of the same sign along a vertical line in the HL band, whereas the coefficients next to the line are small. A horizontal line produces large wavelet coefficients of the same sign along a horizontal line in the LH band. A diagonal line produces middle sized wavelet coefficients of the same sign along a diagonal line in the HL, LH and HH band. See FIG. 4A.

On the first level of decomposition, a halftoned area produces large coefficients of positive and negative sign in the HL and LH band. These coefficients are not connected, but rather "uniformly distributed". In the HH bands, a halftone area produces non-connected large size coefficients. FIG. 4A illustrates the formation of wavelet coefficients of a halftone and diagonal line pattern using a 2D Haar wavelet transform.

The difference in formation of wavelet coefficients of lines and halftone areas can be captured by computing the mean and the standard deviation in a window of a special length directed in horizontal, vertical and both diagonal directions. In terms of those parameters the characterization of lines and halftone areas is shown in Table 3.

TABLE 3

Characterization of lines and halftone area in directional window in the wavelet domain.

| | LH: mean | LH: std | HL: mean | HL: std | HH: mean | HH: std |
|---|---|---|---|---|---|---|
| horizontal lines | large | small | small | small | small | small |
| vertical lines | small | small | large | small | small | small |
| diagonal lines | medium | small | medium | small | medium | small |
| halftone | medium | large | medium | large | medium | large |

It becomes apparent that the mean computed in a horizontal or vertical window is a sufficient criterion for separating horizontal and vertical lines from halftone or diagonal lines. For distinguishing diagonal lines from halftone, the standard deviation has to be computed as an additional criterion. This classification also works on a level larger than one, if the lines have a specific thickness and the halftone a specific frequency. However, since this is information in general not available a priory, the classification is performed only at the first level of decomposition.

In one embodiment, different classification thresholds ($T_1$, $T_2, T_3, T_4$) are chosen to classify line and halftone areas in HL/LH and HH bands. An example for a window of length 3 is:

```
if (mean of horizontal window centered in LH-coefficient d(i,j) > T₁ AND
       std of horizontal window around coefficient d(i,j) < T₂)
   then classify 3×3 window around (i,j) as being horizontal line area
else if (mean of vertical window centered in HL-coefficient d(i,j) > T₁
AND
       std of vertical window around coefficient d(i,j) < T₂))
   then classify 3×3 window around (i,j) as being vertical line area
else if (mean of diagonal SW-NE window centered in HH-coefficient
   d(i,j) > T₃
AND
       std of diagonal SW-NE window around coefficient d(i,j) < T₄)
   then classify 3×3 window around (i,j) as being diagonal line area
else if (mean of diagonal NW-SE window centered in HH-coefficient
   d(i,j) > T₃
AND
       std of diagonal NW-SE window around coefficient d(i,j) < T₄)
   then classify 3×3 window around (i,j) as being diagonal line area
else
       classify 3×3 window around (i,j) as being halftone area
```

Figure 4B:
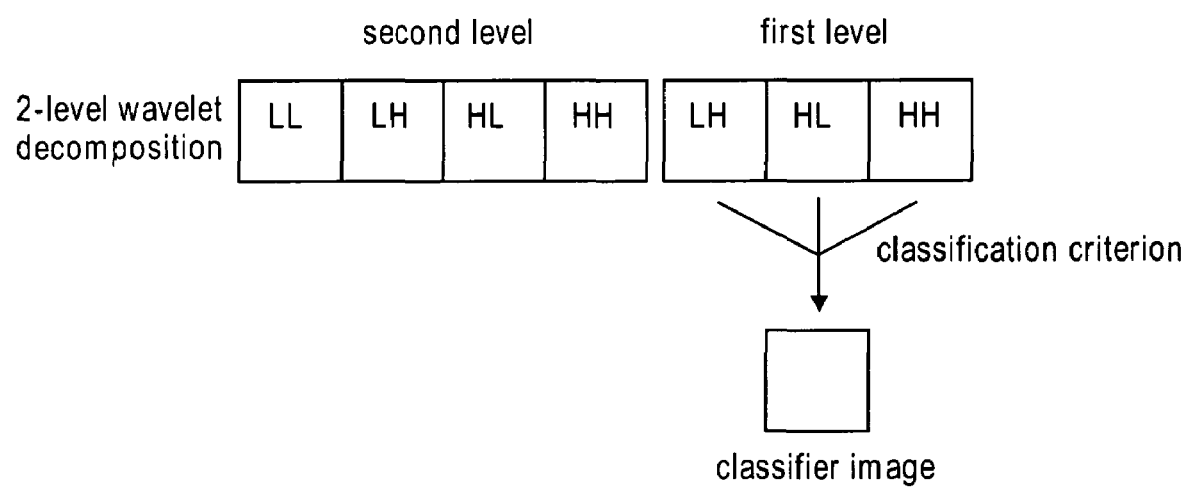
FIG. 4B illustrates a schematic overview of the classification based on the first level wavelet coefficients.

A schematic overview of the classification based on the first level wavelet coefficients is shown in FIG. 4B. This classification can work successfully in the line and halftone area.

FIG. 5 illustrates 3×3 windows in the LH, HL, HH bands at level one of the wavelet decomposition. The bold coefficients are those used for the classifier.

In one embodiment, for construction of the classifier, the following steps are followed.

1. Compute mean of the three bold values in each box in FIG. 5, i.e.

$mean\_LH = (x\_4 + x\_5 + x\_6)/3,$ $mean\_HL = (x\_2 + x\_5 + x\_8)/3,$ $mean1\_HH = (x\_7 + x\_5 + x\_6)/3,$ $mean2\_HH = (x\_1 + x\_5 + x\_9)/3.$ 2. Compute standard deviation of the three bold values in each box, i.e.

$std\_LH = sqrt([(x\_4 - mean\_LH)^2 + (x\_5 - mean\_LH)^2 + (x\_6 - mean\_LH)^2]/3)$ $std\_HL = sqrt([(x\_2 - mean\_HL)^2 + (x\_4 - mean\_HL)^2 + (x\_8 - mean\_LH)^2]/3)$ $std1\_HH = sqrt([(x\_7 - mean1\_HH)^2 + (x\_5 - mean1\_HH)^2 + (x\_3 - mean1\_HH)^2]/3)$ $std2\_HH = sqrt([(x\_1 - mean2\_HH)^2 + (x\_5 - mean2\_HH)^2 + (x\_9 - mean2\_HH)^2]/3).$ 3. Set the complete 3×3 window in the classifier image (positions of $x\_1, \ldots x\_9$) to white if (abs(mean_LH)>thresh_1 && std_LH<thresh_2)
      OR if (abs(mean_HL)>thresh_1 && std_HL<thresh_2)
      OR if (abs(mean1_HH)>thresh_3 && std1_HH<thresh_4) OR if (abs(mean2_HH)>thresh_3 && std2_HH<thresh_4).

This version of the classifier uses the mathematical definition of standard deviation. Of course, the sqrt can be eliminated by adjusting the thresholds thresh_2 and thresh_4. There may also be the possibility of substituting the squares $(.)^2$ by absolute values |.|. Then the thresholds thresh_2 and thresh_4 will have to be chosen appropriately.

A wavelet-based classifier could also be used for nonwavelet-based operations such as halftoning or gamma correction. One example is to detect text of particular sizes in the wavelet domain and to use OCR (optical character recognition) on the text in the pixel domain, perhaps with parameters chosen based on the detected font size.

Wavelet coefficients from different decomposition levels can be used in a classifier.

Classifications can also effect a single coefficient or can effect a region of coefficients.

In one embodiment, a wavelet coefficient is classified as being in a text region if the statistics for it or any of its eight neighbors meet thresholds for text.

Similar to the first method, in an alternative embodiment, a region around that pixel is classified instead of a single pixel. This is essentially looking at the effect of one pixel on a region. The size of the region may depend on the scale L (e.g., the regions are selected to be of size $2^L \times 2^L$).

In yet another embodiment, for each scale $l = l_1 \ldots L$, a threshold $T_i$ is selected. A pixel at position (i,j) is classified as text only if the coefficients at the corresponding positions at all scales $l = 1 - 1 \ldots L$ are the corresponding T1 threshold. Otherwise, the pixel is classified as background.

In still another embodiment, and similar to the previous method, a complete region around the located pixel is classified as text, as opposed to single pixels. Possible size of the regions include, but are not limited to: $2^L \times 2^L$.

In one embodiment, the classification of an image into text, half-tone, continuous tone (or other types) is performed in the wavelet domain or in the spatial domain by a variety of techniques.

Resolution Reduction and Magnification

For resampling of an image (reduction or enlargement), an interpolation filter may be used. Filters with different characteristics lead to different characteristics in the resampled image. Common problems after resampling are increased moire artifacts, less crisp text as well as broken text and lines. One reason for the occurrence of those artifacts is that the global filter characteristics of the interpolation filter do not match the characteristics of a local region in the image. For reduction of moire artifacts, a filter with random elements would be well suited to destroy the periodic noise. For downsampling in text regions, a sharpening filter may be used. For upsampling of lines, a smoothing filter may be used.

Downsampling Combined with Inverse Transform

Since resampling with a linear interpolation filter is a linear operator, it can be combined with the linear wavelet transform into one operator. Therefore, the resampling can be combined with the inverse wavelet transform into one filtering step, and resampling can be done directly on the wavelet coefficients. Since wavelet coefficients contain information on smooth and non-smooth parts of an image, different interpolation filters can be chosen depending on the absolute magnitude of wavelet coefficients or a classifier output or on other wavelet-based criteria or without information from an external classifier.

For example, for downsampling of a one-dimensional signal with a length-4 interpolation filter $[a_0, a_1, a_2, a_3]$ (e.g., Keys filter), given a Haar wavelet decomposition, the interpolation filter can be implemented directly on the two finest level of the decomposition. Out of the redundant Haar wavelet coefficients, select the critically sampled coefficients with phase such that the support of the coefficients is in the length four window. In detail, in order to compute an interpolation point between $x_{2i}$ and $x_{2i+1}$ (length-4 filter applied to window $x_{2i-1}$ to $x_{2i+2}$), the wavelet coefficients $d_i^1$, $d_{i+1}^1$ at level 1 and $d_i^2$ at level 2 and the scaling coefficient $s_i^2$ at scale 2 have to be used. If the inverse transform step for reconstructing the sample $x_{2i}$ is $s_i^2+d_i^2+d_i^1+d_{i+1}^1$, then the exact interpolation filtering procedure on wavelet coefficients is $$x\_int=(a_0+a_1+a_2+a_3)s_i^2+(a_0+a_1-a_2-a_3)d_i^2+(a_0-a_1)d_i^1+(a_2-a_3)d_{i+1}^1$$

For 4-tap linear filters that preserve the DC value, i.e. $a_0+a_1+a_2+a_3=1$, the above equation reduces to $$x\_int=s_i^2+(a_0+a_1-a_2-a_3)d_i^2+(a_0-a_1)d_i^1+(a_2-a_3)d_{i+1}^1$$

Different values for $a_0,a_1,a_2,a_3$ yield different Keys filters. One possible way of performing a signal-adaptive downsampling in the wavelet domain is, for a given a threshold T for wavelet coefficients, select a Key filter that is suited for text if the wavelet coefficients at level two $|d_i^2|$ is larger than T and select a different Keys filter if $|d_i^2|<T$.

In one embodiment, thresholds for selecting the interpolation method or filter may vary with the amount of upsampling and for downsampling. For example, if a particular amount of downsampling is known to be performed, an interpolation method or filter may be selected that is different than that which would be used if no such amount or a different amount of downsampling was being performed.

Similarly, the thresholds for both denoising and interpolation may vary with the amount of upsampling and/or downsampling. The thresholds for classification and interpolation may vary with the amount of upsampling and/or downsampling. Similarly, the windows upon which they operate may vary with the amount of upsampling and/or downsampling.

In one embodiment, the filter varies with the amount of up and/or downsampling, the periodicy filtered varies with the amount of up and/or downsampling, and/or the filter support varies with the amount of up and/or downsampling For a one-dimensional signal of length N, choosing matrix notation, the linear interpolation transform is represented by matrix $F_1$ and the forward wavelet transform by the matrix $W_L$. The matrix representing the combined interpolation and the inverse transform $W_L^{-1}$ is $(F_1 W_L^{-1})$.

In general, given the interpolation filter and the wavelet transform, it is possible to store the filter coefficients for the combined interpolation-inverse transform in a look-up table and use that table for the filtering. If the interpolation filter is of length $N_F$ and the maximum of the length of the wavelet transform analysis lowpass and highpass filter is $N_W$, then the regular filter bank algorithm for the inverse transform can be used from level L down to level L* where $$L^*=\log(\lfloor N_{F,W}\rfloor+1) \text{ with } N_{w,F}=L\cdot 2(\lceil(N_w-1)/2\rceil)+N_F$$

For the remaining levels L* to 1 the modified filtering procedure represented by the matrix $F_1^l W_{L*}^{-l}$ has to be applied. It can be also implemented at all levels l<L*.

A possible application for downsampling in a multifunction machine/copier/etc. is to store the combined interpolation-inverse wavelet transform coefficients for a fixed transform and a family of interpolation filters that covers a range of sharpening and smoothing filters. If a wavelet coefficient at level L or L* is above a given threshold (e.g., belonging to a strong text-edge), then the coefficients for a sharpening filter+ inverse transform filtering is chosen. If the coefficient is below the threshold (e.g., in background regions), then the coefficients for a smoothing filter+inverse transform filtering is chosen. For the latter one it is also possible to pick one interpolation filter randomly out of the family of interpolation filter. This introduced randomness helps to destroy periodicity in areas of moire artifacts.

Upsampling Combined with Inverse Wavelet Transform

A similar technique can be applied for image enlargement via interpolation using a linear filter. As for resolution reduction, the length of the interpolation filter determines the scale at which the interpolation using wavelet coefficients may be implemented. Different interpolation filters might be chosen depending on characteristics of wavelet coefficients (e.g., a smooth filter when coefficients are small, a sharpening filter when coefficients are large, a filter with some random characteristics in halftone regions, etc.).

Inverse Wavelet Transform

A normal inverse transform is performed on the processed wavelet coefficients and the scaling coefficients. In one embodiment, the inverse transform is performed for all L levels. In an alternative embodiment, only L-L* levels are inverted and the remaining L* levels of wavelet coefficients are used for the combined inverse-downsampling transform. If L=L*, no pure inverse is performed.

Gamma Correction

Gamma correction is not done directly on the wavelet coefficients and is performed in the traditional way in the pixel domain. Gamma correction may be performed on the scanned image, and before halftoning.

Halftoning

After gamma correction, the halftoning process based on a wavelet-classifier may be performed. In one embodiment, dither matrices are selected depending on the classifier or changing error diffusion kernels depending on the classifier.

Dithering may be used for halftoning and is commonly done by adding a pseudo random "noise" or "dither" signal to pixel intensities and then thresholding. The signal can have various property that lead to different halftoned images (Ordered Dither, Clustered Dot, Blue Noise Mask).

In one embodiment, halftoning is preferred in the wavelet domain. For that purpose, a scale L is selected and White noise is added to the coefficients at scale l=1 . . . L. The variance of the noise might differ from scale to scale. For example, noise variance might increase from coarse to fine scales. Then an inverse transform is performed and a simple thresholding is applied to the reconstructed image to obtain a bilevel image. The noise that is added to the wavelet coefficients becomes blue noise in the pixel domain.

A prior art "blue noise mask" stores a large dither signal, for example, (256×256) because it is computational difficult to generate "colored" noise in the spatial domain. However, in the wavelet domain adding noise of different intensities to different subbands provides an easy way to generate "blue noise" or any other desired "colored" noise. Thus, noise may be added in the wavelet domain and may be done so that different amounts of noise are added to different bands. For example, text is usually visible in HL, LH, so less noise is added there; more noise would be added in the HH.

An Exemplary Copier

Figure 7:
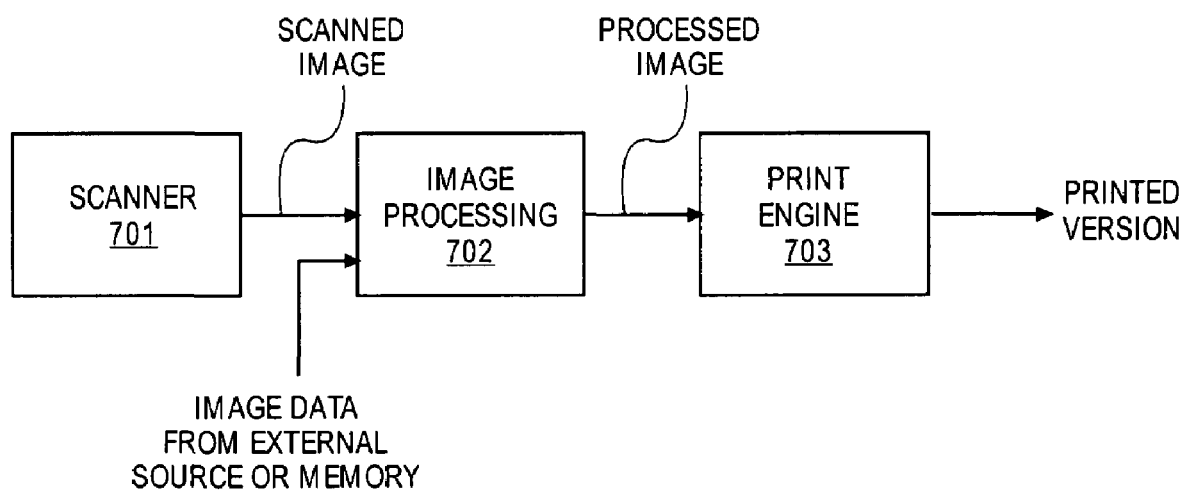
FIG. 7 is a block diagram of one embodiment of a copier.

FIG. 7 is a block diagram of one embodiment of a digital copier. Referring to FIG. 7, digital copier 700 comprises a scanner 701 to scan a hard copy document to create a scanned image. The image processing that contains wavelet-based processing 702 is coupled to scanner 701 to receive the scanned image and generate a processed image. In one embodiment, image processing 702 comprises the processing path shown in FIG. 2C. A printer engine 703 is coupled to image processing to print the processed image.

In one embodiment, copier 700 includes an input to receive electronic versions of documents that may be sent directly to image processing 702 and then to print engine 703.

An Exemplary Computer System

Figure 8:
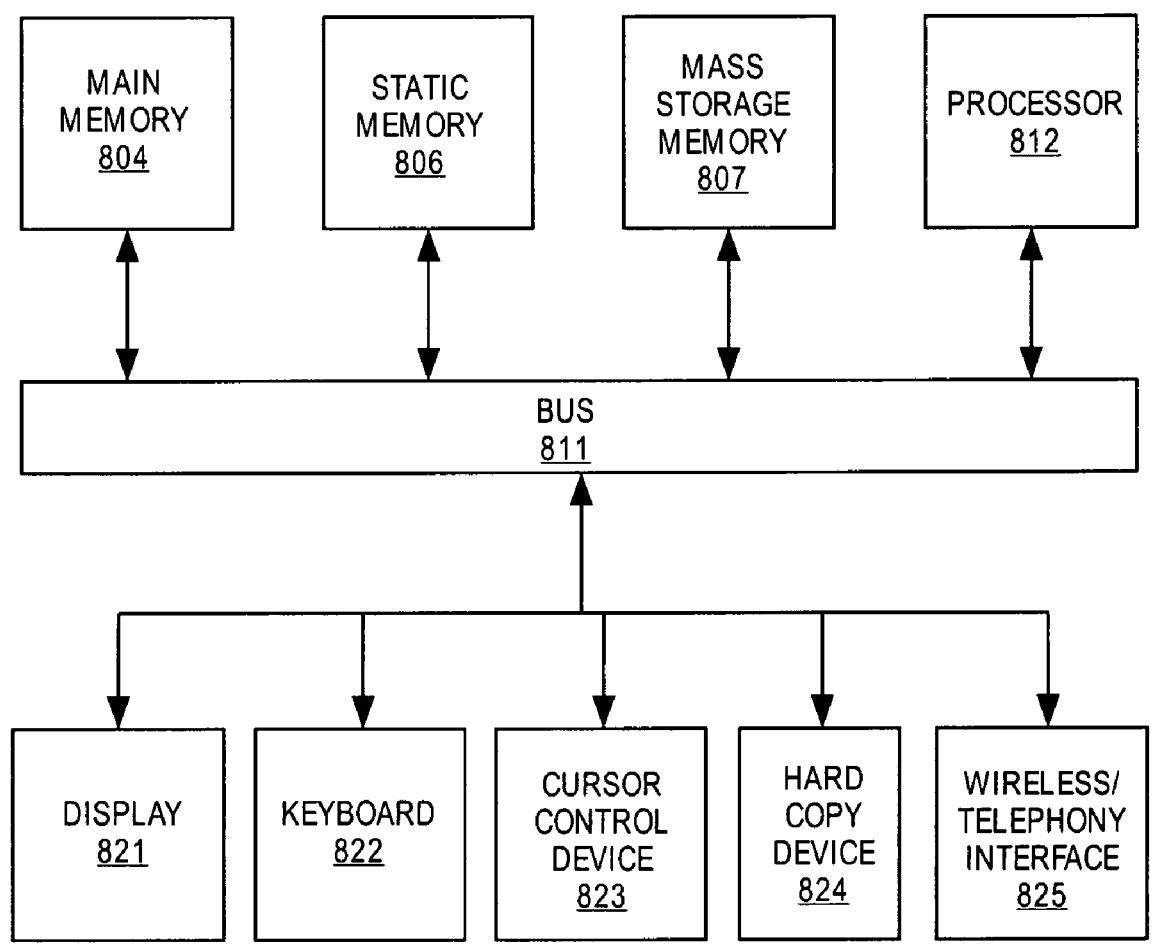
FIG. 8 is a block diagram of one embodiment of a computer system.

An image processing path may be implemented with a computer system such as shown in FIG. 8. Referring to FIG. 8, computer system 800 may comprise an exemplary client or server computer system in which the features described herein may be implemented. Computer system 800 comprises a communication mechanism or bus 811 for communicating information, and a processor 812 coupled with bus 811 for processing information. Processor 812 includes a microprocessor, but is not limited to a microprocessor, such as Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that is coupled to bus 811 is hard copy device 824 operating as a print engine, which may be used for printing images, instructions, data, or other information on a medium such as paper, film, or similar types of media. A scanner 830 is coupled to bus 811 to generate a scanned image.

Furthermore, a sound recording and playback device, such as a speaker and/or microphone may optionally be coupled to bus 811 for audio interfacing with computer system 800.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, an image processing process has been described.

We claim:

1. A system comprising:
a wavelet-based image processing path to enhance an input image in a wavelet domain, wherein the processing path includes a unit to sharpen or smooth text and image regions of the image data corresponding to the input image, wherein the unit is operable to perform denoising by thresholding coefficients generated from the application of a forward wavelet transform to generate denoised coefficients, and rescale the denoised coefficients with a level-dependent parameter to sharpen or smooth the denoised coefficients.

2. The system defined in claim 1 wherein the image processing path comprises:
a forward wavelet transform;
one or more wavelet-based processing blocks; and an inverse wavelet transform.

3. The system defined in claim 2 wherein the forward wavelet transform comprises a critically sampled wavelet transform.

4. The system defined in claim 2 wherein the forward wavelet transform comprises an overcomplete wavelet transform.

5. The system defined in claim 2 wherein the forward wavelet transform comprises a Haar wavelet transform.

6. The system defined in claim 2 wherein the forward wavelet transform comprises a 5,3 wavelet transform.

7. The system defined in claim 2 wherein the forward wavelet transform comprises a 2,6 wavelet transform.

8. The system defined in claim 2 wherein the forward wavelet transform comprises a complex wavelet transform.

9. The system defined in claim 2 wherein the forward wavelet transform comprises a limited redundancy wavelet transform.

10. The system defined in claim 1 wherein denoising is based on at least one given threshold.

11. The system defined in claim 10 wherein coefficients below the at least one given threshold are sent to a predetermined value less than the threshold.

12. The system defined in claim 11 wherein the at least one given threshold is set in the standard deviation or medium of absolute values of HH coefficients at each level.

13. The system defined in claim 11 wherein the at least one given threshold is set based on the standard deviation or medium of absolute values of H/HL/HH coefficients at a first level at a particular level to create a band dependent threshold.

14. The system defined in claim 11 wherein the at least one given threshold is set based on a standard deviation or medium of absolute values of LH/HL/HH coefficients at each level.

15. The system defined in claim 11 wherein the at least one given threshold is set manually using controls on a user interface.

16. The system defined in claim 11 wherein the at least one given threshold is set by computing local variances/mediums of coefficients in between a band.

17. The system defined in claim 11 wherein the at least one given threshold is set using a classifier.

18. The system defined in claim 11 wherein the denoising processing block sets all coefficients below the at least one given threshold to zero.

19. The system defined in claim 11 wherein the at least one given threshold is calculated based on the presence of additive Gaussian white noise in an image.

20. The system defined in claim 11 wherein the at least one given threshold is calculated from a series of test images.

21. The system defined in claim 11 wherein the at least one given threshold comprises different thresholds applied to different levels of decomposition.

22. The system defined in claim 11 wherein the at least on given threshold comprises different thresholds are applied to different bands.

23. The system defined in claim 11 wherein the at least one given threshold is set manually.

24. The system defined in claim 11 wherein the at least one given threshold is set based on the standard deviation or medium of absolute values of coefficients in the region.

25. The system defined in claim 24 wherein the at least one given threshold is set on the standard deviation of HH coefficients at level one.

26. The system defined in claim 1 wherein the unit to sharpen or smooth coefficients scales wavelet coefficients using a scale dependent factor.

27. The system defined in claim 26 wherein scaling is based on the magnitude of individual coefficients.

28. The system defined in claim 26 wherein the scale-dependent factor comprises:

$$\mu_j = R \cdot 2^{\alpha j}$$

where R is a renormalization factor and a is the parameter that determines the degree of sharpening or smoothing.

29. The system defined in claim 28 wherein the sharpening or smoothing processing block uses a scale dependent factor that is selected to include normalization.

30. The system defined in claim 26 wherein the sharpening or smoothing processing block normalizes coefficients after sharpening or smoothing.

31. The system defined in claim 1 further comprising an input operable to receive the input image from an external source and a scanner for generating the input image, wherein the input and the scanner are coupled to the image processing path.

32. A method comprising:
processing an input image by enhancing the input image, including applying a forward wavelet transform to create a plurality of coefficients and filtering coefficients with a coefficient domain operator in a wavelet domain, including sharpening or smoothing text and image data in the wavelet domain corresponding to the input image, wherein the sharpening or smoothing is accomplished by performing denoising by thresholding coefficients generated by applying the forward wavelet transform to generate denoised coefficients, and rescaling the denoised coefficients with a level-dependent parameter to sharpen or smooth the denoised coefficients.

33. The method defined in claim 32 further comprising:
applying one or more wavelet-based processing blocks to coefficients resulting from applying the forward wavelet transform; and
applying an inverse wavelet transform.

34. The method defined in claim 33 wherein the forward wavelet transform comprises a critically sampled wavelet transform.

35. The method defined in claim 33 wherein the forward wavelet transform comprises an overcomplete wavelet transform.

36. The method defined in claim 33 wherein the forward wavelet transform comprises a Haar wavelet transform.

37. The method defined in claim 33 wherein the forward wavelet transform comprises a 5,3 wavelet transform.

38. The method defined in claim 33 wherein the forward wavelet transform comprises a 2,6 wavelet transform.

39. The method defined in claim 33 wherein the forward wavelet transform comprises a complex wavelet transform.

40. The method defined in claim 33 wherein the forward wavelet transform comprises a limited redundancy wavelet transform.

41. The method defined in claim 33 further comprising:
computing a classifier;
selecting different denoising thresholds for halftone and text regions of an image based on the classifier.

42. The method defined in claim 41 wherein computing the classifier comprises computing the classifier from wavelet coefficients.

43. The method defined in claim 42 wherein computing a classifier comprises computing a standard deviation of wavelet coefficients in different bands.

44. The method defined in claim 42 wherein computing a classifier comprises computing a standard deviation of wavelet coefficients in different decomposition levels.

45. The method defined in claim 42 wherein computing a classifier comprises computing a standard deviation of wavelet coefficients across different bands.

46. The method defined in claim 42 wherein computing a classifier comprises computing a first absolute movement.

47. The method defined in claim 42 further comprising:
computing a standard deviation of wavelet coefficients; and
applying different denoising and sharpening/smoothing parameters to wavelet coefficients in text halftone and background regions of image data.

48. A method comprising:
applying, using a processor, a forward wavelet transform to image data;
performing denoising, based on a classification of coefficient regions of the image data, by thresholding coefficients generated by applying the forward wavelet transform; and
rescaling coefficients by filtering coefficients after thresholding, wherein rescaling coefficients comprises performing sharpening or smoothing by multiplying coefficients with a level dependent parameter.

49. The method defined in claim 48 further comprising sampling the wavelet coefficients.

50. The method defined in claim 48 further comprising applying an inverse wavelet transform on filtered coefficients.

51. The method defined in claim 48 wherein high frequency bands are multiplied with a larger factor than low frequency bands to perform sharpening.

52. The method defined in claim 48 wherein low frequency bands are multiplied by a larger factor than the high frequency bands to perform smoothing.

53. The method defined in claim 52 wherein resealing coefficients comprises filtering LL band coefficients with a high pass filter.

54. The method defined in claim 52 wherein resealing coefficients comprises filtering LL band coefficients with a low pass filter.

55. The method defined in claim 48 further comprising filtering of a subband at a specific level decomposition to modify the subband.

56. The method defined in claim 48 further comprising filtering the LL component at the largest decomposition level with a sharpening filter.

57. The method defined in claim 48 further comprising filtering the LL component at the largest decomposition level with a smoothing filter.

58. The method defined in claim 48 wherein filtering coefficients comprises removing periodic patterns in a specific band by applying a filter to the specific band.

59. The method defined in claim 58 wherein the filter comprises a band pass filter.

60. The method defined in claim 58 wherein the filter comprises a notch filter.

61. The method defined in claim 58 wherein the periodic patterns have a period is 3.

62. The method defined in claim 58 wherein the periodic patterns have a period is 5.

63. The method defined in claim 48 further comprising performing half toning.

64. The method defined in claim 63 wherein performing half toning comprises adding white noise with a scaled dependent variance to wavelet coefficients.

65. The method defined in claim 63 wherein performing half toning comprises adding white noise with a subband dependent variance to wavelet coefficients.

66. The method defined in claim 48 further comprising resampling image data.

67. The method defined in claim 66 further comprising performing an inverse wavelet transform.

68. The method defined in claim 67 wherein performing resampling image data and performing inverse wavelet transform are performed simultaneously by performing resampling directly on wavelet coefficients.

69. The method defined in claim 68 wherein the resampling is performed using an interpolation filter.

70. The method defined in claim 69 wherein the interpolation filter comprises a Key's interpolation filter which is implemented on Haar wavelet coefficients.

71. The method defined in claim 70 wherein performing resampling using an interpolation filter comprises computing an overcomplete transform and critically sampling coefficients.

72. The method defined in claim 70 wherein the Key's interpolation filter performs the following procedure on wavelet coefficients:

$$x\_int = (\alpha_0 + \alpha_1 + \alpha_2 + \alpha_3)s_i^2 + (\alpha_0 + \alpha_1 - \alpha_2 - \alpha_3)d_i^2 + (\alpha_0 - \alpha_1)d_i^1 + (\alpha_2 - \alpha_3)d_{i+1}^1.$$

* * * * *